United States Patent Office 3,574,170
Patented Apr. 6, 1971

3,574,170
PROCESS FOR THE PRODUCTION OF
BBB TYPE POLYMER
Edward C. Chenevey, North Plainfield, N.J., assignor to
Celanese Corporation, New York, N.Y.
No Drawing. Filed Oct. 20, 1969, Ser. No. 867,878
Int. Cl. C08g 20/32, 33/02
U.S. Cl. 260—78.4                                                            11 Claims

ABSTRACT OF THE DISCLOSURE

An improved process is provided for the formation of BBB type polymer, i.e. poly(bisbenzimidazobenzophenanthroline) and related nitrogenous polymers. The condensation reaction of at least one organic tetraamine and at least one tetracarboxylic acid (which may optionally be in the form of the corresponding dianhydride) is conducted in a phosphoric acid polymerization medium having an $H_3PO_4$ concentration of about 50 to 110 percent by weight. In a preferred embodiment of the invention the phosphoric acid is present in an $H_3PO_4$ concentration of about 104 to 109 percent by weight, e.g. superphosphoric acid having an $H_3PO_4$ concentration of about 105 percent by weight.

BACKGROUND OF THE INVENTION

In recent years considerable attention has been focused upon the development of polymers having high temperature resistance. Such polymers are useful, for instance, in the fabrication of articles including reentry parachutes for space vehicles, and high temperature insulating materials, etc.

BBB type polymers, and particularly poly(bisbenzimidazobenzophenanthroline), are recognized to be useful in the formation of extremely attractive products which are capable of withstanding highly elevated temperatures. These polymers in filamentary configuration may be formed as described in United States Ser. No. 657,868, filed Aug. 2, 1967 of Jay M. Steinberg and Arnold J. Rosenthal.

Heretofore it has been common to conduct the condensation reaction in which the BBB type polymer (e.g. poly(bisbenzimidazobenzophenanthroline) is formed in an inorganic solvent, polyphosphoric acid, having an $H_3PO_4$ concentration of about 115 percent by weight (i.e. 114 to 117 percent by weight expressed as $H_3PO_4$, or 82 to 84 percent by weight expressed as $P_2O_5$).

It is a further object of the present invention to provide improved process for the formation of BBB type polymer, and particularly poly(bisbenzimidazobenzophenanthroline).

It is an object of the present invention to provide an efficient process for effecting the condensation of at least one organic tetra-amine and at least one tetracarboxylic acid or its corresponding dianhydride to form a BBB type polymer which employs an inorganic polymerization medium other than highly concentrated polyphosphoric acid.

It is another object of the present invention to provide a process capable of producing a BBB type polymer which is capable of forming a shaped article, such as a fiber or a film, exhibiting improved physical properties, e.g. improved tensile properties.

It is a further object of the present invention to provide a process for the formation of BBB type polymer in which the reactants are present in a polymerization medium which permits a highly expeditious admixture and condensation of the same.

These and other objects as well as the scope, nature, and utilization of the invention will be apparent from the following detailed description and appended claims.

SUMMARY OF THE INVENTION

It has been found that in a process for forming a BBB type polymer comprising condensing with intimate admixture at a temperature of about 80 to 300° C.

(1) at least one organic tetra-amine having the structural formula

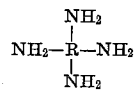

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached, and (2) at least one tetracarboxylic acid or its corresponding dianhydride having the structural formula

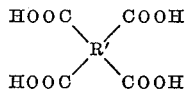

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached, that improved results are achieved by conducting said condensation in a phosphoric acid polymerization medium having an $H_3PO_4$ concentration of about 50 to 110 percent by weight. In a preferred embodiment of the process the phosphoric acid polymerization medium has an $H_3PO_4$ concentration of about 104 to 109 percent by weight. In a particularly preferred embodiment of the process the polymerization medium is superphosphoric acid having an $H_3PO_4$ concentration of about 105 percent by weight.

DETAILED DESCRIPTION OF THE INVENTION

The present invention is generally applicable to the formation of BBB type polymer, i.e. poly(bisbenzimidazobenzophenanthroline) and related nitrogenous polymers. As is now otherwise known in the art these polymers are made by condensing at least one organic tetra-amine with at least one tetracarboxylic acid (which also may be in the form of the corresponding dianhydride).

The organic tetra-amine

The organic tetra-amine has a structural formula

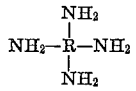

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached. When R is an amino substituted bicycle ring compound, such as a tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetra-amine monomers which may be used individually or in mutual admixture in forming the desired polymers are: 3,3'-diaminobenzidine; bis(3,4-diamino phenyl) methane; 1,2-bis(3,4-diamino phenyl) ethane; 2,2-bis(3,4-diamino phenyl) propane; bis(3,4-diamino phenyl) ether; bis(3,4-diamino phenyl) sulfide; bis(3,4-diamino phenyl) sulfone; 1,2,4,5-tetra-amino benzene; 1,4,5,8-tetra-aminonaphthalene; 2,3,6,7-tetra-aminonaphthalene; etc.; and the corresponding ring-hydrogenated tetra-amines.

The tetracarboxylic acid

The tetracarboxylic acid (which also may be in the form of the corresponding dianhydride) has the structural formula

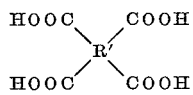

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached. When R' is a carboxyl substituted bicyclic fused ring compound, such as a tetra-carboxyl substituted naphthalene, the carbon atoms at the 1 and 8 positions are considered to be peri to each other, as are the carbon atoms at the 4 and 5 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R contain up to about 20 carbon atoms.

Non-limiting examples of the tetracarboxylic acids include: pyromellitic acid, i.e. 1,2,4,5-benzenetetracarboxylic acid; 2,3,6,7-naphthalene tetracarboxylic acid; 3,3',4,4'-diphenyl tetracarboxylic acid; 1,4,5,8-naphthalene tetracarboxylic acid; 2,2',3,3'-diphenyl tetracarboxylic acid; 2,2-bis(3,4-dicarboxyphenyl) propane; bis(3,4-dicarboxyphenyl) sulfone; 3,4,9,10-perylene tetracarboxylic acid; bis(3,4-dicarboxyphenyl) ether; ethylene tetracarboxylic acid; naphthalene-1,2,4,5-tetracarboxylic acid; decahydronaphthalene-1,4,5,8-tetracarboxylic acid; 4,8-dimethyl-1,2,3,5,6-hexahydronaphthalene-1,2,5,6-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl)propane; 1,1-bis(2,3 - dicarboxyphenyl) ethane; 1,1-bis(3,4-dicarboxyphenyl) ethane; bis-(2,3-dicarboxyphenyl) methane; bis(3,4-dicarboxyphenyl) methane; bis(3,4-dicarboxyphenyl) sulfone; benzene-1,2,3,4-tetracarboxylic acid; 1,2,3,4-butane tetracarboxylic acid; thiophene-2,3,4,5-tetracarboxylic acid; and similar acids, as well as the dianhydrides of such acids. The preferred tetracarboxylic acids contain carboxyl groups peri substituted upon a naphthalene nucleus.

The polymerization medium

The phosphoric acid selected for use as the polymerization medium or solvent surprisingly contains a lesser concentration of the acid expressed as $H_3PO_4$ than has heretofore been deemed essential. The ability for one to effectively utilize a solvent containing a greater proportion of water is considered surprising since one skilled in the art would otherwise believe upon the basis of reaction kinetics that the polymerization reaction would need to be conducted in the best dehydrating medium available. In the prior art the phosphoric acid solvent has been polyphosphoric acid in a concentration of about 115 percent by weight expressed as $H_3PO_4$ (i.e. 114 to 117 percent by weight expressed as $H_3PO_4$, or 82 to 84 percent by weight expressed as $P_2O_5$).

The phosphoric acid solvent utilized in the present process has an acid concentration expressed as $H_3PO_4$ of about 50 to 110 percent by weight, or about 36 to 80 percent by weight expressed as $P_2O_5$. The acid concentration expressed as $H_3PO_4$ may be determined by mixing the same with water and titrating with a standard base after warming to allow depolymerization. The preferred concentration range for the phosphoric acid solvent expressed as $H_3PO_4$ is about 104 to 109 percent by weight, or about 75 to 79 percent by weight expressed as $P_2O_5$.

The phosphoric acid medium selected for use in the process may be a commercially available polyphosphoric acid having the indicated $H_3PO_4$ concentration, or alternatively, it may be formed upon dilution with water of a more concentrated polyphosphoric acid. For instance, the polyphosphoric acid utilized in the prior art containing an $H_3PO_4$ concentration of about 115 percent by weight, and a $P_2O_5$ equivalent of about 82 to 84 percent by weight may be diluted with water to form a phosphoric acid medium of the desired concentration. Such a highly concentrated polyphosphoric acid prior to dilution is a solution of approximately 5 to 20 percent ortho- and pyrophosphoric acids mixed with various more highly polymerized polyphosphoric acids, mostly trimers, tetramers, pentamers, and hexamers. Upon dilution with water the higher acids tend to revert to orthophosphoric acid. Since the viscosity of a polyphosphoric acid increases approximately 50 fold over the $H_3PO_4$ concentration range of 105 to 117 percent by weight, phosphoric acids may be selected or formed for use in the present process exhibiting a substantially reduced viscosity which accordingly promotes easier handling and a more efficient admixture of reactants.

A particularly preferred concentration range for the phosphoric acid medium expressed as $H_3PO_4$ is about 105 percent by weight, i.e. superphosphoric acid which has a $P_2O_5$ equivalent of approximately 76 percent by weight. This phosphoric acid is available commercially under the designation "Phospholeum" from the Monsanto Company, and is a clear liquid at room temperature. The phosphoric acid having a concentration of 105 percent by weight expressed as $H_3PO_4$ is an azeotropic mixture of orthophosphoric and polyphosphoric acids. Upon further dilution with water it will hydrolyze as other polyphosphoric acids to orthophosphoric acid.

Orthophosphoric acid ($H_3PO_4$) in concentration from 50 to 100 percent by weight or 36 to 72 percent by weight expressed as $P_2O_5$ may also be selected as the polymerization medium. At atmospheric temperature (20° C.) the 50 to 75 percent strengths of orthophosphoric acid are mobile liquids. The 85 percent by weight $H_3PO_4$ strength has a syrupy consistency, while the 100 percent by weight $H_3PO_4$ acid is in the form of transparent crystals and must be heated to about 42° C. before it assumes a liquid consistency. Orthophosphoric acid is commonly available commercially as 50, 75, 85, 90, and 100 percent concentrations expressed as $H_3PO_4$, or expressed as $P_2O_5$ in concentrations of 36, 54, 61, 65, and 72 percent by weight respectively.

The condensation reaction

The condensation reaction in which the BBB type polymer is formed is conducted while the reactants are agitated in the presence of the phosphoric acid polymerization medium having an $H_3PO_4$ concentration of about 50 to 110 percent by weight. The reactants are preferably provided in essentially equimolar quantities. From about 10 to 40 kilograms of the phosphoric acid polymerization medium are commonly provided per mole of the reactants. In a preferred embodiment of the invention in which the polymerization medium has an $H_3PO_4$ concentration of about 104 to 109 percent by weight approximately 15 to 25 kilograms of the same are provided per mole of the reactants.

The condensation reaction in preferably conducted in the absence of air so that the organic tetra-amine will not be appreciably oxidized by oxygen in a competing reaction.

The tetracarboxylic acid or its corresponding dianhydride is commonly insoluble in the polymerization medium and is slurried therein as a particulate finely divided solid. However, as the condensation progresses this reactant is simultaneously solutioned as it undergoes polymerization.

The condensation reaction may be conducted at a temperature of about 80° C. to 300° C. for a sufficient time to produce the desired molecular weight. In a preferred embodiment of the invention condensation reaction temperatures of about 150 to 200° C. are employed. If an excessive reaction temperature is used, a product which is difficult or impossible to shape is obtained. But the permissible upper temperature limit will vary depending upon the reactants selected, the polymerization medium used, the mutual proportions of the reactants, their concentration in the polymerization medium, and the minimum time that one desires for the reaction. The particular polymerization temperature that should not be exceeded if a particular system is desired to provide a reaction product composed of a shapable polymer will accordingly vary from system to system but can be determined for any given system by a simple test by any person of ordinary skill in the art.

It is preferred that the molecular weight of the polymer formed be such that its inherent viscosity is at least 0.3 (e.g. 0.5 to 5.0), and most preferably about 2.5 to 2.8. The inherent viscosity is measured at 25° C. at a concentration of 0.4 g. of polymer per 100 ml. of solvent. Ninety-seven percent sulfuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and $C$ is the concentration expressed in grams of polymer per 100 ml. of solution. As is known in the polymer art, inherent viscosity is monotonically related to the molecular weight of the polymer.

Both the reaction temperature and the reaction period used significantly effect the degree of polymerization. Generally, reaction periods can range from about 0.5 to 100 hours at the above-mentioned reaction temperatures. Higher reaction temperatures tend to result in polymer products having a higher inherent viscosity than polymers produced at lower temperatures and at comparable reaction periods.

The BBB type polymer, e.g. poly(bisbenzimidazobenzophenanthroline), can be characterized as being tough, that is, extremely difficult to grind. A typical pulverized sample is completely amorphous by X-ray diffraction and has no softening point up to 450° C., the limiting temperature of the apparatus used. Solutions of these polymers in concentrated sulfuric acid, polyphosphoric acid, benzene sulfonic acid, or methane sulfonic acid are intensively red. BBB type polymer cyclized by heat appears to be essentially insoluble in dimethylformamide, dimethylacetamide, dimethylsulfoxide, cresol, tetramethylene sulfone, hexamethyl phosphoramide and other common organic solvents. Low viscosity polymers exhibit some tendency to dissolve in perfluoroacetic acid and formic acid.

The resulting BBB type polymer may be recovered at the completion of the reaction by any convenient technique such as by pouring the polymerization medium containing the polymer into water with stirring in order to precipitate the same. The polymer is preferably precipitated under high shear conditions, such as by pouring the polymerization medium into a Waring blender containing water.

BBB type polymer exhibiting superior properties may be formed by the treating of the resulting bulk polymer in certain alkaline solutions in accordance with the teachings of United States Ser. No. 867,879 filed concurrently herewith, of Edward C. Chenevey and Rufus S. Jones, Jr., which is assigned to the same assignee as the present invention and is herein incorporated by reference.

Formation of shaped articles

The BBB type polymer formed in accordance with the present process is particularly suited for use in the formation of shaped articles, such as filamentary materials or films which exhibit improved tensile properties as well as excellent resistance to deterioration upon exposure to hot air and light.

As has been previously described in the art, BBB type polymer, and particularly poly(bisbenzimidazobenzophenanthroline), can be formed into filaments by wet-spinning methods, i.e., extruding a solution of the polymer in an appropriate solvent, such as sulfuric acid, through an opening of predetermined shape into a coagulation bath, e.g., a sulfuric acid-water coagulation bath, which results in a filamentary material of the desired cross-section. Polymer solutions may be prepared, for example, by dissolving sufficient polymer in the solvent to yield a final solution suitable for extrusion which contains about 2 to 15 percent by weight, preferably about 3 to 10 percent by weight, of polymer based on the total weight of the solution. It is found that the polymer dissolves most readily on warming to a temperature of between about 50° C. to 70° C. to produce a viscous solution. The sulfuric acid concentration for the spinning solvent preferably has an equivalent $H_2SO_4$ content of about 92 to 102 percent. The polymeric spinning solution is then extruded into a coagulation bath, i.e., wet spun, to form filaments which may then be washed, dried, and hot drawn and ultimately may optionally be passed through a hot flame or an equivalent high temperature zone as fully described in the United States Ser. No. 681,136, filed Nov. 7, 1967, of Jay M. Steinberg and Arnold J. Rosenthal to which reference may be had for further details.

As has been described in co-pending application Ser. No. 657,868, filed Aug. 2, 1967, of Jay M. Steinberg and Arnold J. Rosenthal, while filaments of satisfactory properties can be made from BBB type polymers under a variety of spinning conditions, filaments possessing superior properties can be obtained by maintaining the coagulation bath within certain parameters. For instance, when spinning a BBB type polymer having an inherent viscosity between about 1.0 and 4.0, preferably between 2 and 3, while dissolved in a sulfuric acid solvent and using an aqueous sulfuric acid coagulation bath, it is desirable to miantain such a bath at a temperature between about 45° and 80° C., preferably between 55° and 70° C., and to maintain the sulfuric acid concentration in the bath between about 50 and 80 percent by weight, optimally between about 65 and 75 percent. When operating within these parameters, an as spun fiber is obtained which is suitable for producing after drawn fibers of superior tensile properties and strength retention suitable for use at the extreme elevated temperatures for which the fibers of the present invention are intended.

In accordance with the teachings of United States Ser. No. 867,880, of Jay M. Steinberg, filed concurrently herewith, BBB type polymers may optionally be spun directly from the polyphosphoric acid polymerization medium. The recovery of the polymer and its subsequent dissolution prior to spinning is accordingly avoided. This commonly assigned application is herein incorporated by reference.

After wet spinning, the resulting as spun fibers may be washed thoroughly in order to remove excess acid and to minimize contamination. They may then be dried and drawn in order to improve their physical characteristics, e.g., tenacity, elongation, thermal resistance, etc. Afterdrawing of the fibers is desirably performed at temperatures between about 500° C. and 700° C. at a draw ratio from greater than 1:1 to about 4:1 (e.g. 1.1:1 to 4:1) and preferably between 1.5:1 and 2.5:1. Poly(bisbenzimidazobenzophenanthroline) fibers drawn in this manner may have a strength in excess of 3 grams per denier and thermal resistance at temperatures as high as 700° C. or 800° C. The afterdrawing of BBB type polymer fibers and films is described in detail in commonly assigned United States Ser. No. 867,857, of Jay M. Steinberg which is filed concurrently herewith and herein incorporated by reference.

The following examples are given as specific illustrations of the invention. It should be understood, however, that the invention is not limited to the specific details set forth in the examples. In each example poly(bisbenzimidazobenzophenanthroline) was formed by the condensation of 1,4,5,8-naphthalene tetracarboxylic acid and 3,3'-diamino benzidine to form a fully cyclicized polymer one isomer of which is illustrated in the following equation:

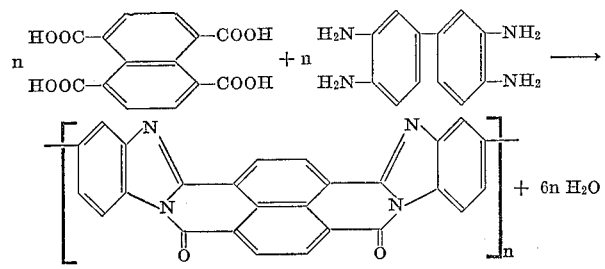

The specific isomer illustrated may be identified as poly-[6,9-dihydro - 6,9 - dioxobisbenzimidazo(2,1-b:1',2'-j) benzo(lmn)(3,8)phenanthroline-2,13-diyl]. It will be apparent to those skilled in the art that various additional isomers will also be produced during the condensation reaction.

EXAMPLE 1

Equimolar quantities of 1,4,5,8-naphthalene tetracarboxylic acid and 3,3'-diamino benzidine were added to a closed reaction vessel provided with a central stirrer. The reactants while at room temperature were degassed three times through the use of a vacuum pump and the vessel filled with a nitrogen atmosphere. Subsequent to degassing air was excluded from the interior of the reaction vessel by a flow of nitrogen.

Polyphosphoric acid having an $H_3PO_4$ concentration of 108.8 percent by weight and of 78.7 percent by weight expressed as $P_2O_5$ was selected as the polymerization medium. The polyphosphoric acid polymerization medium was formed from commercially available polyphosphoric acid having an $H_3PO_4$ concentration of 115 percent by weight by dilution with water. The polyphosphoric acid was heated to 100° C. and a vacuum was applied to the same to remove air. The polyphosphoric acid was cooled to below 80° C. and incrementally added to the reaction vessel with moderate stirring over a period of 15 minutes in a total quantity equivalent to 24 kg. of the polyphosphoric acid per gram mole of the reactants to form a thick slurry. The 3,3'-diamino benzidine largely dissolved while the 1,4,5,8-naphthalene tetracarboxylic acid remained as a solid in the slurry.

When the introduction of the polyphosphoric acid was begun, heat was applied to the reaction vessel. After approximately 30 minutes the contents of the reaction vessel reached 100° C. The stirring speed was then set at 150 r.p.m. The reaction vessel was maintained at 100° C. for approximately 1 hour and 30 minutes to insure adequate admixture of the reactants, and then the temperature of the reaction vessel was progressively raised at a rate of 12.5° C. per hour. After 7.2 hours a temperature of 190° C. was achieved, and this temperature was maintained for 8.3 hours during which time the bulk of the polymerization occurred.

The contents of the reaction vessel were next poured into a separate vessel provided by a central agitator containing a copious quantity of deionized water to precipitate the polymer. The temperature of the water was raised to the boiling point, and the deionized water was replaced at least three times to produce a water washed polymer having an I.V. of 3.2 suspended by stirring in essentially neutral deionized water.

The particulate bulk polymer was next subjected to treatment with an alkaline compound by boiling the polymer for approximately 1 hour while suspended by stirring in a copious quantity of 0.12 N. sodium hydroxide. The treatment was conducted in accordance with the teachings of United States Ser. No. 867,879, of Edward C. Chenevey and Rufus S. Jones, Jr., filed concurrently herewith, which is assigned to the same assignee as the present invention and is herein incorporated by reference. The polymer was next washed with dilute hydrochloric acid in order to remove residual base, washed with water until neutral, washed with methanol to remove residual water and vacuum dried. The resulting polymer exhibited an I.V. of 2.7.

The polymer was dissolved in 97 percent by weight $H_2SO_4$ at 60° C. to form a spinning solution containing 5.0 percent solids by weight. The spinning solution was charged to a conventional dope bomb and extruded under nitrogen pressure into a 100 cm. coagulation bath at a rate of 5 m./min. The spinneret was a 10-fil, 100 micron jet. The coagulation bath was aqueous sulfuric acid containing 68 percent $H_2SO_4$ by weight which was maintained at 60° C. The resulting fiber was next washed in ammonium hydroxide having a temperature of about 80° C. and a pH of about 8, and subsequently in water The fiber was dried at room conditions and drawn in a muffle furnace having an air atmosphere at a feed speed of 2 m./min. according to the teachings of commonly assigned United States Serial No. 867,880 of Jay M. Steinberg, filed concurrently herewith, which is herein incorporated by reference.

The properties of the fiber before and after drawing, and the draw temperatures and the draw ratios utilized are listed in the table.

EXAMPLE 2

Example 1 was repeated with the following exceptions.

Polyphosphoric acid having an $H_3PO_4$ concentration of 105.0 percent by weight and of 76.0 percent by weight expressed as $P_2O_5$ was selected as the polymerization medium. The $P_2O_5$ distribution was as follows: orthophosphoric acid 49%, pyrophosphoric acid 42%, triphosphoric acid 8%, tetraphosphoric acid 1%, and higher polymer acid 0%. The polyphosphoric acid was commercially available under the designation super phosphoric acid. The reactants were maintained at a temperature of 190° C. for 12.3 hours. The bulk polymer had an I.V. of 3.49 prior to caustic washing, and an I.V. of 2.51 after caustic washing. The polymer was dissolved in 97 percent by weight $H_2SO_4$ at 60° C. to form a spinning solution containing 5.3 percent solids by weight.

The properties of the fiber before and after drawing, and the draw temperatures and draw ratios utilized are listed in the table.

EXAMPLE 3

Example 1 was repeated with the following exceptions.

Polyphosphoric acid having an $H_3PO_4$ concentration of 102.0 percent by weight and of 73.8 percent by weight expressed as $P_2O_5$ was selected as the polymerization medium. The polyphosphoric acid polymerization medium was formed from commercially available polyphosphoric acid having an $H_3PO_4$ concentration of 115 percent by weight by dilution with water. The reactants were maintained at a temperature of 190° C. for 7.8 hours. The bulk polymer had an I.V. of 2.56 prior to caustic washing, and an I.V. of 2.18 after caustic washing. The polymer was dissolved in 97 percent by weight $H_2SO_4$ at 60° C. to form a spinning solution containing 6.2 percent solids by weight.

The properties of the fiber before and after drawing, and the draw temperatures and draw ratios utilized are listed in the table.

Comparative polymerization

The procedure of Example 1 was repeated for comparative purposes, employing a conventional polyphosphoric acid polymerization medium, i.e. a polymerization medium containing a highly concentrated phopshoric acid.

The polyphosphoric acid was commonly available, and had an $H_3PO_4$ concentration of 116.4 percent by weight, and of 84.3 percent by weight expressed as $P_2O_5$. The reactants were maintained at a temperature of 190° C. for 38 hours. The bulk polymer had an I.V. of 3.65 prior to caustic washing, and an I.V. of 2.63 after caustic washing. The polymer was dissolved in 97 percent by weight $H_2SO_4$ at 60° C. to form a spinning solution containing 4.8 percent solids by weight.

The properties of the fiber before and after drawing, and the draw temperatures and draw ratios utilized are listed in the table.

medium for reuse is also simplified since it is not essential to drive off essentially all of the water present in the same.

EXAMPLE 4

This example illustrates an embodiment of the invention in which the phosphoric acid utilized as the polymerization medium has a concentration of substantially less than 100 percent by weight expressed as $H_3PO_4$.

Example 1 was substantially repeated with the exception that the phosphoric acid polymerization medium had an $H_3PO_4$ concentration of 85 percent by weight, and of 61.5 percent by weight expressed as $P_2O_5$. The medium was a commercially available orthophosphoric acid. The reactants were maintained at a temperature of 190° C. for 10¾ hours. The bulk polymer had an I.V. of 1.0.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. In a process for forming a BBB type polymer comprising condensing with intimate admixture at a temperature of about 80 to 300° C.

(1) at least one organic tetra-amine having the structural formula

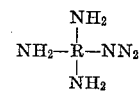

TABLE

| Polymer | Properties | As spun fiber | Draw temperature-draw ratio | | | | | |
|---|---|---|---|---|---|---|---|---|
| | | | 500–525 C | | 55° C. | | 575–600° C. | |
| | | | 1.5–1.6 | 1.7–1.8 | 1.5–1.6 | 1.7–1.8 | 1.5–1.6 | 1.7–1.8 |
| Example 1 (108.8% $H_3PO_4$) | DPF | 8.0 | 4.5 | 4.3 | 4.5 | 4.2 | (¹) | 4.4 |
| | El. (%) | 81 | 9.0 | 5.3 | 6.6 | 5.0 | (¹) | 3.3 |
| | Ten. (g./d.) | 1.45 | 3.19 | 3.58 | 3.41 | 4.07 | (¹) | 3.65 |
| | TE 1/2 | 13.0 | 9.6 | 8.3 | 8.8 | 9.2 | (¹) | 6.6 |
| Example 2 (105.0% $H_3PO_4$) | DPF | 5.7 | 3.6 | 3.1 | (¹) | (¹) | 3.6 | (¹) |
| | El. (%) | 65 | 7.3 | 4.1 | (¹) | (¹) | 8.0 | (¹) |
| | Ten. (g./d.) | 1.62 | 3.33 | 4.59 | (¹) | (¹) | 3.70 | (¹) |
| | TE 1/2 | 13.2 | 9.0 | 9.3 | (¹) | (¹) | 10.5 | (¹) |
| Example 3 (102.0% $H_3PO_4$) | DPF | 6.6 | 4.1 | 3.3 | 4.3 | 3.4 | 4.2 | 3.7 |
| | El. (%) | 76 | 9.6 | 3.0 | 7.8 | 3.7 | 6.1 | 4.2 |
| | Ten. (g./d.) | 1.68 | 3.31 | 5.11 | 3.52 | 5.2 | 3.83 | 4.80 |
| | TE 1/2 | 14.6 | 10.3 | 8.9 | 9.9 | 10.0 | 9.5 | 9.8 |
| Comparative example (116.4% $H_3PO_4$) | DPF | 8.1 | 4.7 | (¹) | (¹) | (¹) | 4.5 | (¹) |
| | El. (%) | 68 | 7.6 | (¹) | (¹) | (¹) | 3.5 | (¹) |
| | Ten. (g./d.) | 1.3 | 3.1 | (¹) | (¹) | (¹) | 3.2 | (¹) |
| | TE 1/2 | 10.4 | 8.6 | (¹) | (¹) | (¹) | 6.0 | (¹) |

¹ Not tested.

NOTE.—DPF=denier per filament; El. (%)=elongation in percent. Ten. (g./d.)=tenacity in grams per denier; TE 1/2=index of fiber organization wherein T is tenacity at break in grams per denier and E is elongation in percent extension from original length to length at break in tensile test (an explanation of this test and its significance is given in the Textile Research Journal 36, No. 7, pages 593–602, July 1966).

The preceding examples as well as the results reported in the above table indicate that a BBB type polymer exhibiting outstanding properties is formed in the present process. This result is considered surprising since one skilled in the art would otherwise be led to believe that the condensation reaction should be conducted in the best dehydrating medium, e.g. highly concentrated polyphosphoric acid. The tensile properties of the fibers produced in Examples 1, 2, 3, were superior to those achieved in the comparative example utilizing a conventional highly concentrated and more costly polyphosphoric acid polymerization medium. When conducting the polymer forming reaction in accordance with the present invention, the polymerization medium may also be substantially less viscous thereby enabling a more efficient admixture of the reactants, and the shortening of the time required to accomplish the desired degree of polymerization. Recovery of the phosphoric acid polymerization wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached, and (2) at least one tetracarboxylic acid or its corresponding dianhydride having the structural formula

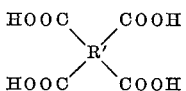

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached;

the improvement of conducting said condensation in a phosphoric acid polymerization medium having an $H_3PO_4$ concentration of about 50 to 110 percent by weight.

2. A process according to claim 1 wherein said BBB type polymer is a condensation product of 3,3'-diamino benzidine and 1,4,5,8-naphthalene tetracarboxylic acid.

3. A process according to claim 1 wherein said phosphoric acid polymerization medium has an $H_3PO_4$ concentration of about 104 to 109 percent by weight.

4. A process according to claim 1 wherein said condensation is conducted at a temperature of about 150 to 200° C.

5. In a process for forming a BBB type polymer comprising condensing with intimate admixture at a temperature of about 80 to 300° C.

(1) at least one organic tetra-amine having the structural formula

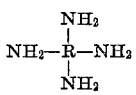

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached, and (2) at least one tetracarboxylic acid or its corresponding dianhydride having the structural formula

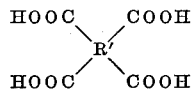

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached;

the improvement of conducting said condensation in a phosphoric acid polymerization medium having an $H_3PO_4$ concentration of about 105 percent by weight.

6. A process according to claim 5 wherein said BBB type polymer is a condensation product of 3,3'-diamino benzidine and 1,4,5,8-naphthalene tetracarboxylic acid.

7. A process according to claim 5 wherein said condensation is conducted at a temperature of about 150 to 200° C.

8. In a process for forming poly(bisbenzimidazobenzophenanthroline) comprising condensing with intimate admixture at a temperature of about 80 to 300° C. (1) 3,3'-diamino benzidine and (2) 1,4,5,8-naphthalene tetracarboxylic acid; the improvement of conducting said condensation in a phosphoric acid polymerization medium having an $H_3PO_4$ concentration of about 50 to 100 percent by weight.

9. A process according to claim 1 wherein said condensation is conducted at a temperature of about 150 to 200° C.

10. A process according to claim 1 wherein said polymerization medium has an $H_3PO_4$ concentration of about 104 to 109 percent by weight.

11. A process according to claim 9 wherein said polymerization medium has an $H_3PO_4$ concentration of about 105 percent by weight.

References Cited

UNITED STATES PATENTS 3,414,543  12/1968  Paufler _____ 260—47

JOSEPH L. SCHOFER, Primary Examiner

J. KIGHT III, Assistant Examiner

U.S. Cl. X.R.

260—47, 30.6, 78

UNITED STATES PATENT OFFICE
CERTIFICATE OF CORRECTION

Patent No. 3574170  Dated April 6, 1971

Inventor(s) Edward C. Chenevey

It is certified that error appears in the above-identified patent and that said Letters Patent are hereby corrected as shown below:

In column 1 line 51 delete --further--.

In column 10, line 32 delete --$NN_2$-- and insert --$NH_2$--.

Signed and sealed this 31st day of August 1971.

(SEAL)
Attest:

EDWARD M. FLETCHER, JR.  ROBERT GOTTSCHALK
Attesting Officer  Acting Commissioner of Patent